United States Patent [19]
Draskovich et al.

[11] Patent Number: 5,544,896
[45] Date of Patent: Aug. 13, 1996

[54] COMPOSITE FACE SEAL

[75] Inventors: Barry S. Draskovich, Scottsdale; M. Rifat Ullah, Phoenix, both of Ariz.

[73] Assignee: AlliedSignal Inc., Morris Township, N.J.

[21] Appl. No.: 384,162

[22] Filed: Feb. 6, 1995

[51] Int. Cl.⁶ ............................................. F16J 15/34
[52] U.S. Cl. ........................ 277/22; 277/96; 277/96.2
[58] Field of Search ...................... 277/22, 96, 96.2, 277/233, 235 A, 235 R, DIG. 6

[56] References Cited

U.S. PATENT DOCUMENTS

| | | | |
|---|---|---|---|
| 3,594,011 | 7/1971 | Haller | 277/96 |
| 3,871,834 | 3/1975 | Kuniya et al. | 277/DIG. 6 |
| 3,873,168 | 3/1975 | Viola et al. | 277/DIG. 6 |
| 4,536,127 | 8/1985 | Rossmann et al. | 415/174 |
| 4,948,151 | 8/1990 | Janzen et al. | 277/27 |
| 4,969,652 | 11/1990 | Munson | 277/22 |
| 5,080,378 | 1/1992 | Kagawa | 277/96 |
| 5,292,137 | 3/1994 | Simmons et al. | 277/1 |

FOREIGN PATENT DOCUMENTS

| | | | |
|---|---|---|---|
| 2252409 | 6/1973 | Germany | 277/96.2 |
| 3529774 | 2/1987 | Germany | 277/DIG. 6 |
| 66140 | 6/1977 | Japan | 277/DIG. 6 |
| 148657 | 12/1978 | Japan | 277/96.2 |
| 47058 | 4/1980 | Japan | 277/96.2 |
| 388156 | 10/1973 | U.S.S.R. | 277/96.2 |

*Primary Examiner*—Scott Cummings
*Attorney, Agent, or Firm*—Jerry J. Holden; James W. McFarland

[57] ABSTRACT

A face seal includes an annular carbon stator having a flat surface in rubbing contact with the flat surface of a composite annular rotor. The annular rotor has a head portion and a base portion. Embedded in the head portion are high thermal conductivity graphite fibers that are oriented to maximize heat dissipation. Incorporation of graphite fibers makes the rotor resistant to time-dependent creep deformation, thus preserving sealing integrity.

10 Claims, 1 Drawing Sheet

5,544,896

COMPOSITE FACE SEAL

TECHNICAL FIELD

The present invention relates generally to sealing devices and in particular to face seals used in gas turbine engines.

BACKGROUND OF THE INVENTION

Face seals are used in gas turbine engines to prevent the leakage of fluid along rotating shafts where the shaft extends through a stationary structure such as a wall or partition. Referring to FIG. 1, a typical face seal is comprised of a stationary stator 22, having a flat surface that rubs against a flat surface of a rotating rotor 20. The rubbing of these surfaces generates significant amounts of heat and as a result high temperatures and thermal gradients within the rotor 20 form. These thermal gradients must be managed to prevent failure of the seal. A major contributor to this adverse thermal reaction of many seals is the thermal conductive resistance within the rotor 20 which is directly related to the thermal conductivity of the material from which the rotor 20 is made. When the thermal load of the seal is not managed, the formation of coke (burned oil) at the sealing flat surface 23 can occur. Also, the adverse thermal gradients cause the flat surface 23 of the rotor 20 to swing away from the flat surface of the stator 22 resulting in leakage.

One approach to this problem has been to provide external or internal cooling of the rotor 20 in the form of oil jets or coolant passages. However, these approaches add significant complexity to the design of the rotor, are expensive, and are not always practical due to space limitations. Another approach has been to make the rotor from ceramics. A disadvantage of ceramics is their brittleness. Yet another approach is to use high conductivity copper alloys such as Copper-beryllium. However, such alloys can be too soft for many applications resulting in deformation of the rotor 20 over a period of time (a phenomenon known as "creep" deformation). This creep deformation causes the seal to become significantly out-of-flat at the sealing flat surface.

Accordingly, there is a need for a face seal having the rotor configured to dissipate heat in the most efficient manner when subjected to high thermal loads without causing creep deformation of the seal.

SUMMARY OF THE INVENTION

An object of the present invention is to provide a face seal having a rotor configured to dissipate very high amounts of heat.

Another object of the present invention is to reinforce conventional copper alloy seal rotor to make them resistant to time-dependent creep deformation.

Yet another object of the present invention is to achieve very high heat dissipation within the seal rotor without using moving parts, or oil jets.

The present invention achieves these objectives by providing a face seal that is comprised of an annular carbon stator having a flat surface in rubbing contact with the flat surface of a composite annular rotor. The annular rotor has a head portion and a base portion. Embedded in the head portion are high thermal conductivity graphite fibers that are oriented to maximize heat dissipation. Incorporation of graphite fibers makes the rotor resistant to time-dependent creep deformation, thus preserving sealing integrity. The flat surface of the rotor is coated with a hard material to minimize wear.

BRIEF DESCRIPTIONS OF THE DRAWINGS

DESCRIPTION OF THE PREFERRED EMBODIMENT

Figure 1:
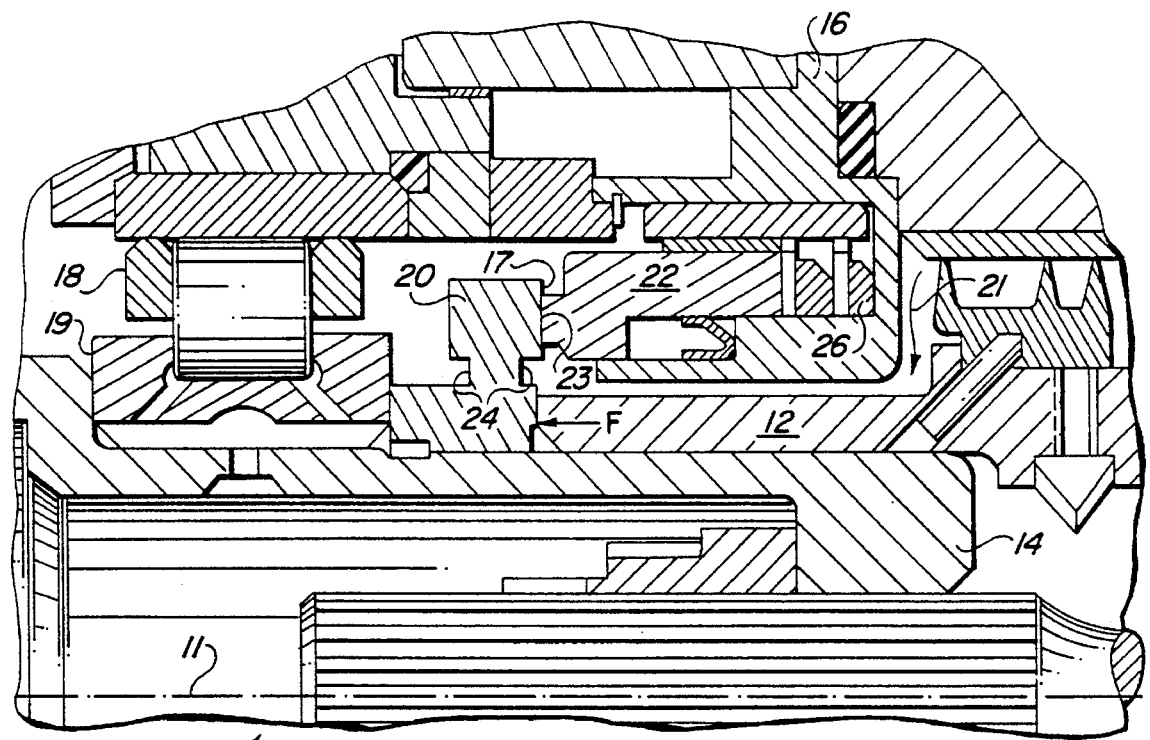
FIG. 1 is a cross-sectional view of a gas turbine engine having a conventional face seal.

Referring to drawings, FIG. 1 shows a compressor section of a gas turbine engine generally denoted by the reference numeral 10. The compressor 10 has a rotating compressor disk 12 coupled to the rotating shaft 14. Circumscribing the shaft 14 is a stationary housing 16. The housing 16 is mounted atop a bearing 18 having an inner race 19 which is mounted on the shaft 14. A conventional, annular metallic seal rotor 20 is mounted for rotation on the shaft 14 and has a base portion that abuts at one axial end the inner race 19 and at the other axial end the compressor disk 12. A portion of the housing 16 circumscribes a portion of the compressor disk 12 defining a leakage path, referenced by the arrow 21. Mounted within the housing 16 is a conventional, annular carbon stator 22 that has a flat surface 23 that is in rubbing contact with a flat surface 17 of the rotor 20. The surfaces 17 and 23 are flat as manufactured to within three helium light bands which is about 0.000040 inches. A spring 26 forces the surfaces 17 and 23 together to seal the leakage path 21. Due to the manner of engine assembly, a compressive, clamping force, represented by arrows F, is transmitted through the base portion of the rotor 20. The compressor 10 extends axially and is concentric about an engine centerline 11.

Figure 2:
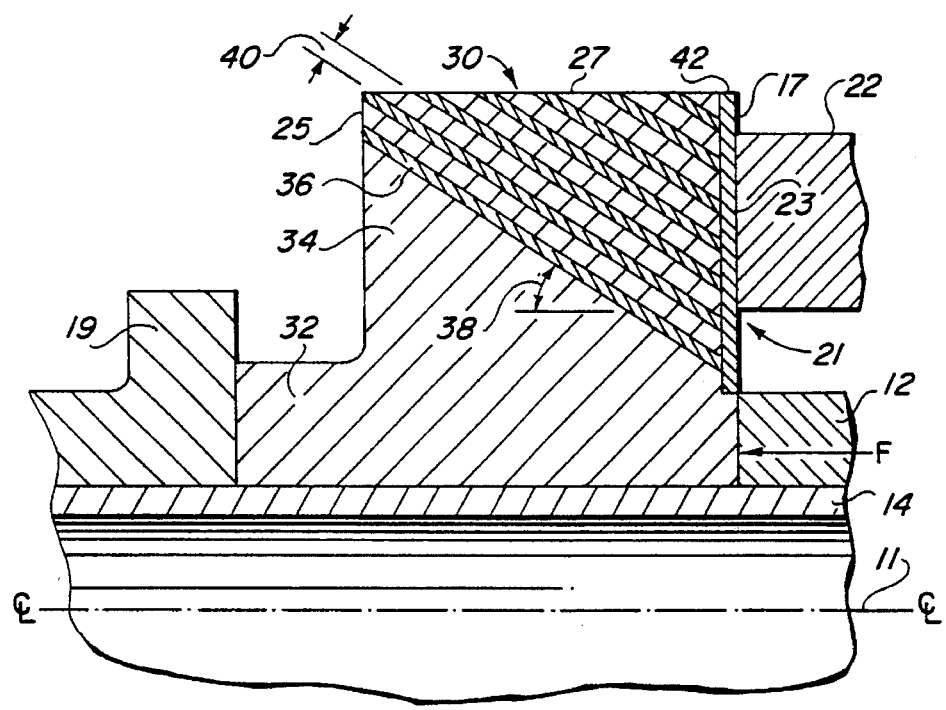
FIG. 2 is a cross-sectional view of the face seal contemplated by the present invention.

In the preferred embodiment, the annular conventional metallic seal rotor 20 is replaced with a rotor 30 as shown in FIG. 2. The rotor 30 has a base portion 32 which transmits the clamping force F, and a head portion 34. The head portion 34 is bounded axially by the flat surface 17 and a backface surface 25, and radially by an outer surface 27. The rotor 30 is composed of a metal matrix having a plurality of graphite fibers 36 embedded in the head portion 34. The combination of metal matrix with the fibers is referred to as a metal matrix composite. The fibers 36 can be either annular sheets or in the form of thread-like filaments. Preferably, the thermal conductivity of the fibers 36 should be between 200 Btu/(hr.ft.F) and 650 Btu/(hr.ft.F). The metal matrix can be any conventional steel such as steel 440C, or copper alloy such copper-beryllium. The rotor 30 made from such a metal matrix composite is estimated to have a thermal conductivity 4 to 5 times greater than the thermal conductivity of compared to the state-of-the-art copper alloy rotors and about 20 to 25 times greater that when compared to the conventional steel rotors.

The fibers 36 are disposed within the head portion 34 at an angle 38 relative to the axial direction. The angle 38 is selected using finite element analysis to maximize the dissipation of the heat generated at the sealing flat surfaces 17,23. Preferably, the angle 38 is at most 60 degrees. The pitch or spacing 40 between successive, parallel fibers will be determined from the amount of graphite needed for achieving the necessary heat rejection rate. However, the ratio of graphite fiber to the metal matrix surrounding it, on a volumetric basis, should be less than or equal to one-half. The fibers 36 extend from the flat surface 17 to either the backface surface 25 or the outer surface 27. Processes for embedding the fibers 36 into the rotor 30 may include hot pressing of metal coated fibers, melt infiltration of a fiber preform, or foil-fiber-foil compacts.

To prevent excessive wear of the ends of the fibers 36 at the flat surface 17, a coating 42 is applied over the surface 17. The coating 42 is comprised of conventional coating materials, such as Chrome plating, Titanium-nitride, or Diamond-Like-Carbon. For the coating 42 to provide adequate wear protection while adding no significant resistance to heat flow, its thickness should be in the range of 0.0003 inches to 0.003 inches. The coating 42 preferably should have a thermal conductivity in excess of 50 Btu/(hr.ft.F), but not less than 10 Btu/(hr.ft.F). For best results the coating should be restricted to the portion of the rotor that is most likely to wear due to friction, and should not be applied to the base portion 32.

Though the shape of the rotor 30 is different from the shape of the rotor 20 which has annular grooves 24, it is not critical to the operability of the present invention. That is, the present invention is applicable to all conventional rotor shapes.

An advantage to the face seal 30 is that when the fibers are embedded in copper based alloys, the resulting metal matrix composite is significantly more resistant to time-dependent "creep" deformation. This added benefit allows this invention to be used in seals that could have benefited from the use of copper alloy, but are too soft to withstand creep deformation.

Though the preferred embodiment has been described in the context of a face seal in a gas turbine engine, the present invention can be used to seal between any rotating shaft and a stationary housing. Various modifications and alterations to the above described embodiment will be apparent to those skilled in the art. Accordingly, this description of the invention should be considered exemplary and not limiting the scope and spirit of the invention as set forth in the following claims.

What is claimed is:

1. A face seal comprising an annular rotor having a base portion and a head portion, said head portion having a first flat surface in rubbing contact with a second flat surface of an annular stator, said annular rotor made of a metal matrix having a plurality of graphite fiber embedded only in said head portion, said head portion having an outer surface extending from said first flat surface to a backface surface which is parallel to said first flat surface, at least one of said fibers extending from said first flat surface to said outer surface, and at least one of said fibers extending from said first flat surface to said backface surface.

2. The face seal of claim 1 wherein said stator and rotor are concentric about a centerline and said graphite fibers are oriented at an angle from said centerline.

3. The face seal of claim 2 wherein said angle is at most sixty degrees.

4. A face seal comprising an annular rotor having a base portion and a head portion, said heat portion having a first flat surface in rubbing contact with a second flat surface of an annular stator, said annular rotor made of a metal matrix having a plurality of graphite fibers embedded therein so as to dissipate heat from said rubbing contact, said stator and rotor being concentric about a centerline and said graphite fibers are oriented at an angle that is at most sixty degree from said centerline.

5. The face seal of claim 4 wherein said graphite fibers are only embedded in said head portion.

6. The face seal of claim 4 wherein the ratio of graphite fiber to the metal on a volumetric basis is not greater than one half.

7. The face seal of claim 5 wherein said head portion has an outer surface extending from said first flat surface to a backface surface which is parallel to said first flat surface and at least one of said fibers extends from said first flat surface to said outer surface.

8. The face seal of claim 7 wherein at least one of said fibers extends from said first flat surface to said backface surface.

9. The face seal of claim 7 wherein said first flat surface is coated with a hard material.

10. The face seal of claim 9 wherein the thickness of said coating is between 0.0003 inches and 0.003 inches.

* * * * *

UNITED STATES PATENT AND TRADEMARK OFFICE
CERTIFICATE OF CORRECTION

PATENT NO. : 5,544,896

DATED : August 13, 1996

INVENTOR(S) : Barry S. Draskovich and M Rifat Ullah

It is certified that error appears in the above-identified patent and that said Letters Patent is hereby corrected as shown below:

Col. 4, line 14, delete "heat", insert --head--.

Signed and Sealed this

Twelfth Day of November, 1996

Attest:

BRUCE LEHMAN

*Attesting Officer*     *Commissioner of Patents and Trademarks*